United States Patent [19]

Yamamoto et al.

[11] Patent Number: 6,087,424
[45] Date of Patent: *Jul. 11, 2000

[54] RUBBER COMPOSITION

[75] Inventors: Keisaku Yamamoto; Kizuku Wakatsuki; Hayato Saba, all of Chiba, Japan

[73] Assignee: Sumitomo Chemical Company Limited, Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/614,931

[22] Filed: Mar. 11, 1996

[30] Foreign Application Priority Data

Mar. 9, 1996 [JP] Japan ................................... 7-049683

[51] Int. Cl.[7] ........................................................ C08J 5/24
[52] U.S. Cl. ........................... 524/265; 524/266; 524/269; 524/505
[58] Field of Search .................................... 524/269, 505, 524/265, 266

[56] References Cited

U.S. PATENT DOCUMENTS 4,201,698  5/1980  Itoh et al. .................................... 260/3
4,436,847  3/1984  Wagner .................................... 523/203
5,260,123  11/1993  Hergenrother et al. ................. 428/246

FOREIGN PATENT DOCUMENTS

4308311A1  9/1994  Germany .
6-248116  6/1994  Japan .

*Primary Examiner*—Peter D. Mulcahy
*Attorney, Agent, or Firm*—Pillsbury Madison & Sutro LLP

[57] ABSTRACT

A rubber composition obtained by kneading a mixture comprising 100 parts by weight of a solution polymerized diene rubber, 5–100 parts by weight of silica, 1–15 parts by weight of a silane coupling agent, and 1–20 parts by weight of an organic silicon compound having a number average molecular weight of about 100–10,000, and maintaining the temperature during the kneading at 200° C. or less. The composition is excellent in wear resistance and productivity, has lower rolling resistance and is useful, for example, for automobile tires.

10 Claims, No Drawings

RUBBER COMPOSITION

BACKGROUND OF THE INVENTION

1. Field of the Invention

The present invention relates to a rubber composition.

More precisely the present invention relates to a rubber composition which is excellent in mechanical strength and wear resistance, has a lower rolling resistance and is excellent in productivity because of its fast vulcanization velocity.

2. Background Information

Rubber compositions containing silica have been widely used for colored or white rubber because of the fact that they are more easily colored than rubber compositions containing carbon black. They have also been used for tires based on their characteristic of having a smaller loss in energy in temperatures equal to or higher than room temperature. Vulcanized rubber obtained by vulcanizing rubber compositions containing silica, however, are insufficient in mechanical strength such as tear strength, and are inferior in productivity because of their slow vulcanizing velocity.

JP-A-6-248116 discloses a rubber composition for tires containing silica in which the surface of silica was treated with an organic silica compound, for example, at 250° C. for an hour. This composition, however, has the disadvantage that the vulcanized rubber obtained from the rubber composition is still insufficient in wear resistance. Furthermore, it has the disadvantage that productivity of the rubber composition is inferior because a surface-treated silica must be separately prepared by treating the surface of silica.

As a result of extensive studies with the objective of obtaining a rubber composition without these disadvantages, the present inventors have found that rubber compositions containing silica which is not surface-treated, and which are obtained by kneading under controlled temperatures of 200° C. or less are excellent in wear resistance, have a lower rolling resistance and are excellent in productivity because of its fast vulcanization velocity, and thus have completed the present invention.

SUMMARY OF THE INVENTION

Accordingly, the present invention provides a rubber composition obtainable by kneading a mixture comprising 100 parts by weight of a component (A), 5–100 parts by weight of a component (B), 1–15 parts by weight of a component (C) and 1–20 parts by weight of a component (D), while controlling the maximum temperature during the kneading to 200° C. or less,
where (A) is a solution polymerized diene rubber, (B) is silica, (C) is a silane coupling agent, and (D) is an organic silicon compound having a number average molecular weight between about 100 and about 10,000.

Rubber compositions of the present invention are well-balanced in tear strength, rubber elasticity (300% modulus), rolling resistance (tan δ) index, and vulcanization velocity. Tear strength is preferably no less than about 50 kgf/cm$^2$; rubber elasticity (300% modulus) is preferably no less than about 118 kgf/cm$^2$; loss on wearing is preferably no greater than about 450 mg/1000 cycles; and vulcanization velocity ($t_{90}$min) is preferably no greater than about 32. The rolling resistance (tan δ) index is preferably no greater than about 111 when using SBR(A1) as component (A) and is preferably no greater than about 102 when using SBR(A2) as component (A).

DETAILED DESCRIPTION OF THE INVENTION

The present invention is described in more detail below.

Component (A) in the present invention is a solution polymerized diene rubber. Specific examples of the solution polymerized diene rubber include a solution polymerized butadiene rubber (BR), a solution polymerized styrene-butadiene rubber (SBR), a solution polymerized isoprene rubber (IR) and the like. From the viewpoint of tire use, a solution polymerized butadiene rubber and a solution polymerized styrene-butadiene rubber are preferred. In the present invention, the precise chemical structure of the solution polymerized diene rubber is not particularly limited.

These types of rubber may be used independently or in combination.

Component (B) in the present invention is silica. There are various kinds of silica which differ in the concentration of the surface hydroxyl group, pH and particle properties. While silica used in the present invention is not limited, a silica having an amount of DBA (dibutylamine) absorption of 100–400 mmol/kg, pH of 5–12 and BET specific surface area of 50–300 m$^2$/g is preferred.

The amount of component (B) in the rubber composition of the present invention is 5–100 parts by weight, preferably 30–90 parts by weight per 100 parts by weight of component (A). If the amount of component (B) is too small, the mechanical strength of the vulcanized rubber is lowered. When the amount of component (B) is too high, the kneading processability and mechanical strength of the vulcanized rubber are lowered.

Component (C) in the present invention is a silane coupling agent. Specific examples of the silane coupling agent include compounds represented by the formulae (1) and (2) shown below. These compounds may be used independently or in combination thereof.

$$((OR)_3SiC_aH_{2a})_2S_b \quad (1)$$

$$(OR)_3SiC_aH_{2a}Z \quad (2)$$

In the above formula, R represents a methyl group or an ethyl group. An ethyl group is preferred. a represents an integer of 1–8 and preferably an integer of 2–5. b represents an integer of 1–6 and preferably an integer of 2–5. Z represents a mercapto group, an epoxy group, a vinyl group or an amino group optionally substituted by one or two methyl or ethyl groups. When Z is an amino group, it is preferably dimethylamino.

Examples of compounds represented by formula (1) include bis(trimethoxysilylmethyl) disulfide, bis(2-trimethoxysilylethyl) disulfide, bis(2-trimethoxysilylethyl) tetrasulfide, bis(2-trimethoxysilylethyl) pentasulfide, bis(2-trimethoxysilylethyl) hexasulfide, bis(3-trimethoxysilylpropyl) disulfide, bis(3-trimethoxysilylpropyl) trisulfide, bis(3-trimethoxysilylpropyl) tetrasulfide, bis(3-trimethoxysilylpropyl) pentasulfide, bis(3-trimethoxysilylpropyl) hexasulfide, bis(4-trimethoxysilylbutyl) tetrasulfide, and compounds in which a methoxy group in the above listed compounds is replaced by an ethoxy group and the like.

Examples of compounds represented by the formula (2) include 1-mercapto-2-trimethoxysilylethane, 1-mercapto-3- trimethoxysilylpropane, 1-mercapto-4-trimethoxysilylbutane, 1,2-epoxy-3-trimethoxysilylpropane, 1,2-epoxy-4-trimethoxysilylbutane, 3-trimethoxysilyl-1-propene, 4-trimethoxysilyl-1-butene, 1-dimethylamino-2-trimethoxysilylethane, 1-dimethylamino-3-trimethoxysilylpropane 1-dimethylamino-4-trimethoxysilylbutane, compounds in which a methoxy group in the above listed compounds is replaced by an ethoxy group and the like.

Among the compounds represented by the formula (1) and (2), bis(3-triethoxysilylpropyl) trisulfide, bis(3-triethoxysilylpropyl) tetrasulfide, and bis(3-triethoxysilylpropyl) pentasulfide are preferred.

The amount of component (C) in the rubber composition of the present invention is 1–15 parts by weight, preferably 2–10 parts by weight per 100 parts by weight of component (A). If the amount of component (C) is too small, the vulcanization velocity and the mechanical strength of the vulcanized rubber are lowered. If the amount is too large, the mechanical strength is lowered and the production cost is increased. When two or more of the compounds are used as component (C), the amount of component (C) is considered to be the total amount of all types of the compounds used as component (C).

Component (D) in the present invention is an organic silicon compound having a number average molecular weight of about 100–10,000. Specific examples of component (D) include low molecular weight organic silicon compound having a hydroxyl group and dimethyl polydimethylsiloxane which is a straight chain type and both ends are methylated.

Specific examples of low molecular weight organic silicon compounds having a hydroxyl group include compounds represented by the following formula (3).

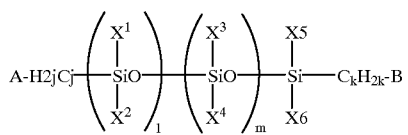

(3)

In formula (3), A and B represent independently a hydrogen atom, a hydroxyl group or a vinyl group. From the viewpoint of improving vulcanization velocity and mechanical strength of the vulcanized rubber, it is preferred that both A and B are hydroxyl groups. l and m represent independently integers of 1–100. From the viewpoint of improving vulcanization velocity, mechanical strength of the vulcanized rubber and kneading processability, integers of 1–50 are preferred, integers of 2–10 are more preferred. j and k represent independently integers of 0–50. From the viewpoint of improving vulcanization velocity, mechanical strength of the vulcanized rubber and kneading processability, j and k are preferably 0–20 and more preferably 0. $X_1$–$X_6$ represent independently a phenyl group, a vinyl group or a group represented by the following formula (4):

(4)

In formula (4), Y represents a hydrogen atom or a hydroxyl group and n represents an integer of 0–50. From the viewpoint of improving vulcanization velocity, mechanical strength of the vulcanized rubber and kneading processability, n is preferably an integer of 0–20 and more preferably 0 or 1. $X_1 X_6$ are preferably a phenyl group, a vinyl group, a methyl group or a hydroxy group.

Examples of the compound represented by the formula (3) include compounds of the following formula:

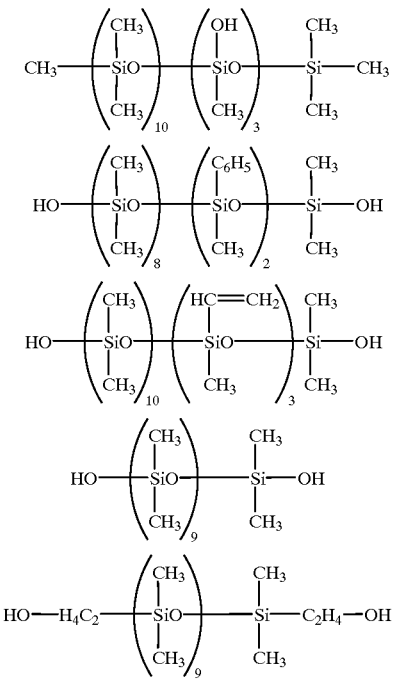

Specific examples of the above-mentioned dimethyl polydimethylsiloxane which is a straight chain type and both ends are methylated include a compound of the following formula (5).

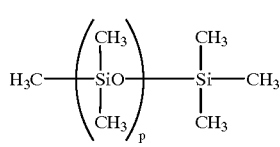

(5)

In formula (5), p represents an integer of 0–200. From the viewpoint of improving vulcanization velocity and mechanical strength of the vulcanized rubber and kneading processability, p is preferably an integer of 2–100 and more preferably an integer of 4–50.

In the present invention, component (D) is used independently or in combination. From the view point of decreasing rolling resistance and increasing vulcanization velocity, compounds having a hydroxyl group as shown by formula (3) are preferred.

The amount of component (D) in the rubber composition of the present invention is 1–20 parts by weight, preferably 2–10 parts by weight per 100 parts by weight of component (A). If the amount of component (D) is too small, the effects of increasing the vulcanization velocity and the mechanical strength of the vulcanized rubber and decreasing rolling resistance are lowered. When the amount is too large, the mechanical strength is lowered. When two or more of the compounds are used together as component (D), the amount of component (D) is considered to be the total amount of all types of compounds used as component (D).

The rubber composition of the present invention can be obtained by kneading the predetermined amounts of the components (A)–(D) as described above and controlling the maximum temperature during the kneading to 200° C. or less. Components (C) and (D) are essential. When either component (C) or component (D) is not used, properties such as vulcanization velocity, kneading processability, mechanical strength of vulcanized rubber and rolling resistance are remarkably inferior.

The kneading may be performed by using a usual kneading machine such as rolls, a Banbury mixer and the like until the components are uniformly mixed. The maximum temperature during kneading must be 200° C. or less and is preferably 80° C. or more, more preferably 100–160° C. If the temperature is too low, the mechanical strength of the vulcanized rubber is lowered. If the temperature is too high, deterioration of the rubber occurs. In kneading, a commonly used rubber such as a natural rubber, an emulsion polymerized butadiene rubber, an emulsion polymerized styrene-butadiene rubber and the like, carbon black, an antioxidant, a vulcanizing agent such as sulfur, organic peroxide and the like, a vulcanizing accelerator, a processing aid, stearic acid, a reinforcing material, a filler, a plasticizer, a softening agent and the like may be added in addition to the components (A)–(D) which are essential to the present invention.

According to the present invention, it is possible to obtain a rubber composition which is excellent in mechanical strength and wear resistance, has a lower rolling resistance and is excellent in productivity because of its fast vulcanization velocity.

The rubber composition of the present invention can be used for various parts of automobiles, various parts of industrial materials, materials for architecture and so on. The rubber composition of the present invention is used most suitably for tires because of its excellent mechanical strength and wear resistance and low rolling resistance. Rubber compositions are also described in Japanese Application No. JPA 07-49683, filed Mar. 9, 1995, the disclosure of which is hereby incorporated by reference.

EXAMPLES

The present invention will now be illustrated in further detail by means of Examples which, however, should not be construed as a limitation upon the scope of the invention.

Examples 1–9 and Comparative Examples 1–6

Into a 1,500 ml Banbury mixer adjusted to 110° C. were concurrently charged the ingredients shown in Table 1, 50 parts by weight of X-140 (manufactured by Kyodo Sekiyu, an oil) and 6.4 parts by weight of Diablack N339 (manufactured by Mitsubishi Chemicals, HAF carbon black), which were kneaded at a revolution number of rollers of 150 rpm for 5 minutes. The maximum temperature during the kneading is shown in Tables 1–4. After adding 1.5 parts by weight of Sunknock N (manufactured by Outi Shinko Kagaku, an age resistor), 1.5 parts by weight of Antigen 3C (manufactured by Sumitomo Chemical Co., Ltd., an age resistor), 2 parts by weight of zinc oxide and 2 parts by weight of stearic acid as the common combination, the kneading was continued using an 8 inch open roll adjusted to 85° C. Then, 1 part by weight of Sox CZ (manufactured by Sumitomo Chemical Co., Lt., a vulcanizing accelerator), 1 part by weight of Sox D (manufactured by Sumitomo Chemical Co., Ltd., a vulcanizing accelerator) and 1.4 parts by weight of sulfur were added and the kneading was further continued to yield a compound. This compound was subjected to press vulcanization at 160° C. for 20 minutes to give a vulcanized rubber, which was evaluated by the methods described below. The results are shown in Table 1.

TABLE 1

|  | Example | Comparative Example | | |
|---|---|---|---|---|
|  | 1 | 1 | 2 | 3 |
| Composition |  |  |  |  |
| (A) |  |  |  |  |
| Kind*1 | A1 | A1 | A1 | A1 |
| Amount (wt). | 100 | 100 | 100 | 100 |
| (B)*2 | 78.5 | 78.5 | 78.5 | 78.5 |
| Amount (wt) |  |  |  |  |
| (C)*3 | 6.4 | 6.4 | 0 | 0 |
| Amount (wt) |  |  |  |  |
| (D) |  |  |  |  |
| Kind*4 | D1 | — | D1 | — |
| Amount(wt) | 5 | 0 | 5 | 0 |
| Maximum Temperature during Kneading(° C.) | 152 | 151 | 153 | 153 |
| Evaluation |  |  |  |  |
| Tear Strength kgf/cm$^2$ | 57 | 54 | 46 | 53 |
| 300% Modulus kgf/cm$^2$ | 124 | 121 | 40 | 49 |
| Loss on Wearing mg/1000 cycle | 370 | 372 | 996 | 564 |
| Tan δ (60° C.) Index | 100 | 91 | 146 | 111 |
| Vulcanization Velocity $t_{90}$min | 16 | 36 | 30 | 35 |

TABLE 2

|  | Example | | | |
|---|---|---|---|---|
|  | 2 | 3 | 4 | 5 |
| Composition |  |  |  |  |
| (A) |  |  |  |  |
| Kind*1 | A2 | A2 | A2 | A2 |
| Amount(wt) | 100 | 100 | 100 | 100 |
| (B)*2 | 78.5 | 78.5 | 78.5 | 78.5 |
| Amount(wt) |  |  |  |  |
| (C)*3 | 6.4 | 6.4 | 6.4 | 6.4 |
| Amount(wt) |  |  |  |  |
| (D) |  |  |  |  |
| Kind*4 | D1 | D1 | D1 | D1 |
| Amount (wt) | 7 | 5 | 3 | 1 |
| Maximum Temperature during Kneading(° C.) | 148 | 151 | 150 | 152 |
| Evaluation |  |  |  |  |
| Tear Strength kgf/cm2 | 52 | 53 | 54 | 55 |
| 300% Modulus kgf/cm2 | 139 | 143 | 148 | 124 |
| Loss on Wearing mg/1000 cycle | 335 | 384 | 347 | 395 |
| Tan δ (60° C.) index | 94 | 100 | 102 | 101 |
| Vulcanization Velocity $t_{90}$min | 18 | 20 | 27 | 27 |

TABLE 3

|  | Comparative Example | | | |
|---|---|---|---|---|
|  | 4 | 5 | 6 | 7 |
| Composition |  |  |  |  |
| (A) |  |  |  |  |
| Kind*1 | A2 | A2 | A2 | A2 |
| Amount(wt). | 100 | 100 | 100 | 100 |
| (B)*2 | 78.5 | 78.5 | 78.5 | 78.5*5 |
| Amount(wt) |  |  |  |  |
| (C)*3 | 6.4 | 0 | 0 | 6.4 |
| Amount(wt) |  |  |  |  |

TABLE 3-continued

| | Comparative Example | | | |
|---|---|---|---|---|
| | 4 | 5 | 6 | 7 |
| (D) | | | | |
| Kind*[4] | — | D1 | — | D2*[5] |
| Amount(wt) | 0 | 5 | 0 | 10 |
| Maximum Temperature during Kneading(° C.) | 151 | 149 | 153 | 141 |
| Evaluation | | | | |
| Tear Strength kgf/cm$^2$ | 51 | 35 | 42 | 47 |
| 300% Modulus kgf/cm$^2$ | 115 | 33 | 63 | 129 |
| Loss on Wearing mg/1000 cycle | 357 | 518 | 558 | 554 |
| Tan δ (60° C.) Index | 107 | 144 | 99 | 95 |
| Vulcanization Velocity t$_{90}$min | 34 | 36 | 41 | 27 |

TABLE 4

| | Example | | | |
|---|---|---|---|---|
| | 6 | 7 | 8 | 9 |
| Composition | | | | |
| (A): | | | | |
| Kind*[1] | A1 | A1 | A1 | A1 |
| Amount (wt) | 100 | 100 | 100 | 100 |
| (B)*[2] Amount(wt) | 78.5 | 78.5 | 78.5 | 78.5 |
| (C)*[3]: Amount (wt) | 6.4 | 6.4 | 6.4 | 6.4 |
| (D): | | | | |
| Kind*[4] | D2 | D2 | D3 | D3 |
| Amount (wt). | 3 | 1 | 3 | 1 |
| Maximum Temperature during Kneading(° C.) | 151 | 152 | 152 | 151 |
| Evaluation | | | | |
| Tear Strength kgf/cm$^2$ | 54 | 54 | 52 | 55 |
| 300%. Modulus kgf/cm$^2$ | 118 | 124 | 119 | 129 |
| Loss on Wearing mg/1000 cycle | 404 | 372 | 435 | 407 |
| Tan δ (60° C.) Index | 109 | 107 | 108 | 111 |
| Vulcanization Velocity t$_{90}$min | 31 | 32 | 29 | 30 |

*[1](A1): a solution polymerized SBR (styrene unit/vinyl unit: 15/45 (wt %/%) ML$_{1+4}$ 125° C. = 87) manufactured by adding SiCl$_4$ as a coupling agent
A2: a solution polymerized SBR (styrene unit/vinyl unit: 29/49 (wt %/%) ML$_{1+4}$ 125° C. = 91) manufactured by adding SiCl$_4$ as a coupling agent
*[2](B): silica (SiO$_2$) (Ulterasil VN3G, manufactured by United Silica)
*[3](C): A compound of formula (1), as defined above, wherein R is ethyl, a is 3 and b is 4.
*[4]D1: A compound (molecular weight: 611) of formula (3) as defined above, wherein A and B are hydroxyl groups, j, k and m are 0, 1 is 7 and x$_1$, x$_2$, x$_5$ and x$_6$ are methyl groups.
D2: A compound (molecular weight: 533) of formula (5) as defined above, wherein p is 6 (manufactured by Shin-etsu Kagaku Kogyo, KF96L-5).
D3: A compound (molecular weight: 2610) of formula (5) as defined above, wherein p is 34 (manufactured by Shin-etsu Kagaku Kogyo, KF96L-50).
*[5]compound (B) and compound (D) are premixed at 250° C. for an hour.

Comparative Example 7

The procedure in Example 1 was substantially repeated except that component (B) and component (D) were premixed at a temperature of 250° C. for an hour. The results are shown in Table 3.

Comparative Example 8

The procedure in Example 1 was substantially repeated except that a Banbury mixer was adjusted to 140° C, the maximum temperature was controlled at 210° C. during kneading and the kneading was conducted for 10 minutes.

Only a gelled product was formed and evaluation was impossible.

Method of Evaluation:

(1) Tear strength, Rubber elasticity (300% modulus) and Vulcanization velocity:

These were measured according to JIS-K-6252. In the measurement of the tear strength, an angle type sample with no cutting was used.

(2) Wear resistance (Loss on wearing):

The measurement was conducted according to JIS-K-6264 using an Akron wear resistance tester.

(3) Rolling resistance (tan δ) index:

This measurement was performed as described in JIS-K-6394 except that a testing plate of 50 mm(L)×5 mm(W)×2 mm (D) was used. A tan δ temperature dispersion curve was obtained by plotting values measured under the conditions of a frequency of 10 Hz, an initial strain of 10%, a vibration amplitude of ±0.25% and a rise in temperature of 2° C./min by Leograph Solid L1R (manufactured by Toyo Seiki) and a tan δ at 60° C. was obtained from this curve. The values of tan δ in Examples and Comparative Examples using A1 as component (A) are expressed by indices taking the value in Example 1 as 100 and the values of tan in Examples and Comparative Examples using A2 as component (A) are expressed by indices taking the value in Example 3 as 100. A smaller index means that the rolling resistance is smaller.

What is claimed is:

1. A rubber composition obtained by kneading a mixture comprising 100 parts by weight of a component (A), 5–100 parts by weight of a component (B), 1–15 parts by weight of a component (C) and 1–20 parts by weight of a component (D), while maintaining the temperature during kneading at 200° C. or less, wherein (A) is a solution polymerized diene rubber,
(B) is silica,
(C) is a silane coupling agent, and
(D) is a low molecular weight organic silicon compound having at least one hydroxyl group represented by the following formula (3):

$$\text{A-H}_{2j}\text{C}_j \left( \begin{array}{c} X^1 \\ | \\ \text{SiO} \\ | \\ X^2 \end{array} \right)_l \left( \begin{array}{c} X^3 \\ | \\ \text{SiO} \\ | \\ X^4 \end{array} \right)_m \begin{array}{c} X^5 \\ | \\ \text{Si} \\ | \\ X^6 \end{array} \text{---C}_k\text{H}_{2k}\text{-B} \qquad (3)$$

wherein A and B independently represent a hydroxyl group; l and m independently represent integers of 2–10; j and k independently represent integers of 0–20; and X$_1$–X$_6$ independently represent a phenyl group, a vinyl group or a group represented by the following formula (4):

$$\text{---C}_n\text{H}_{2n}\text{Y} \qquad (4)$$

wherein Y represents a hydrogen atom or a hydroxyl group and n represents an integer of 0–20, said organic silicon compound having a number average molecular weight of about 100–10,000.

2. The rubber composition according to claim 1, wherein component (A) is a butadiene rubber or a styrene-butadiene rubber.

3. The rubber composition according to claim 1, wherein component (C) comprises at least one agent selected from the compounds represented by formulas (1) and (2):

  (1)

  (2)

wherein R represents a methyl group or an ethyl group; a represents an integer of 1–8; b represents an integer of 1–6; and Z represents a mercapto group, an epoxy group, a vinyl group or an amino group.

4. The rubber composition according to claim 1, wherein the maximum temperature during the kneading is 100–160° C.

5. A process for producing a rubber composition which comprises kneading a mixture comprising 100 parts by weight of a component (A), 5–100 parts by weight of a component (B), 1–15 parts by weight of a component (C) and 1–20 parts by weight of a component (D) and maintaining the temperature during the kneading at 200° C. or less, wherein (A) is a solution polymerized diene rubber,
(B) is silica,
(C) is a silane coupling agent, and
(E) is a low molecular weight organic silicon compound having at least one hydroxyl group represented by the following formula (3):

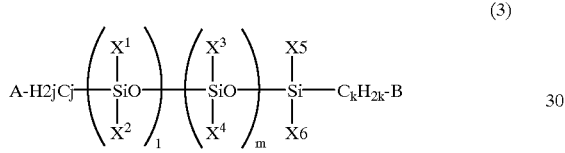  (3)

wherein A and B independently represent a hydroxyl group; l and m independently represent integers of 2–10; j and k independently represent integers of 0–20; and $X_1 X_6$ independently represent a phenyl group, a vinyl group or a group represented by the following formula (4):

  (4)

wherein Y represents a hydrogen atom or a hydroxyl group and n represents an integer of 0–20, said organic silicon compound having a number average molecular weight of about 100–10,000.

6. The process for producing the rubber composition according to claim 5, wherein the maximum temperature during the kneading is 100–160° C.

7. A vulcanized rubber obtained by vulcanizing the rubber composition according to claim 1.

8. The rubber composition according to claim 1, wherein A and B represent independently a hydroxyl group, l and m represent independently integers of 2–10; j and k represent independently integers of 0, and X1–X6 represent a member from the group consisting of a phenyl group, a vinyl group, a methyl group and a hydroxyl group.

9. The rubber composition according to claim 1, wherein component (D) is at least one compound selected from the group consisting of compounds represented by the following formulas:

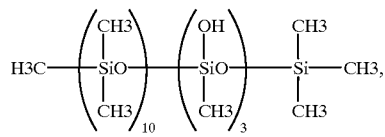

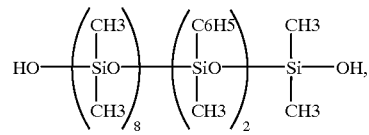

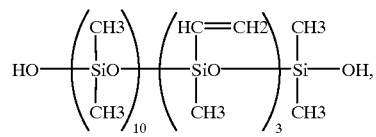

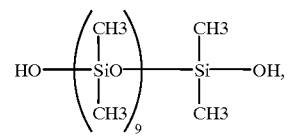

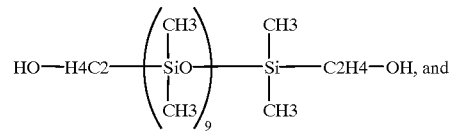

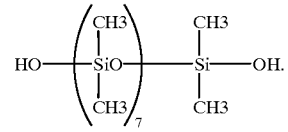

10. The rubber composition according to claim 1, wherein component (D) is the compound represented by the following formula:

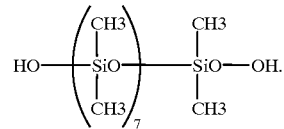

* * * * *